Figure 1:
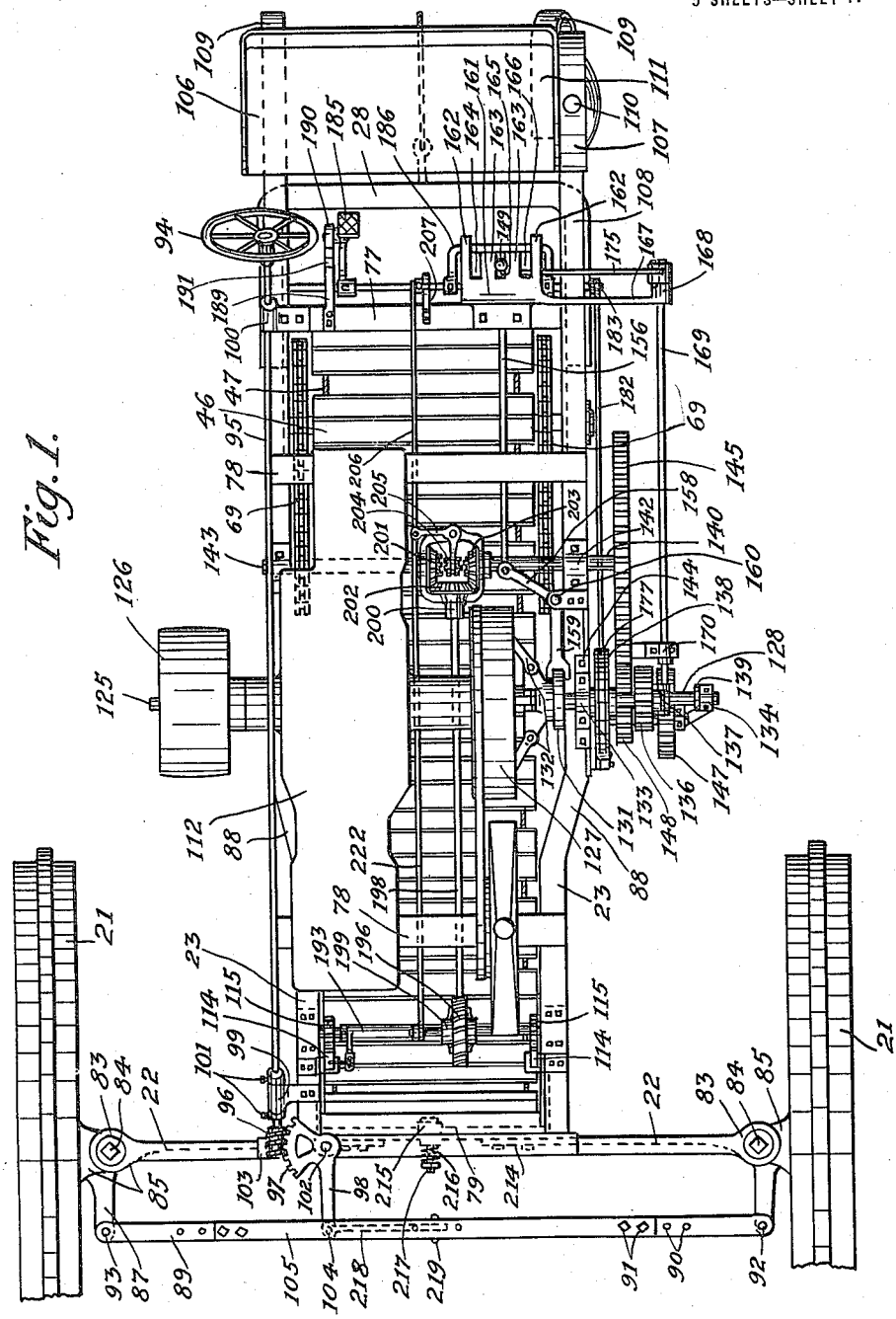

DE WITT NELSON.
TRACTION ENGINE.
APPLICATION FILED JULY 9, 1915. RENEWED JUNE 21, 1918.

1,299,855.

Patented Apr. 8, 1919.
5 SHEETS—SHEET 1.

Witnesses:
Theo. Lagaard.
H. A. Bowman.

Inventor:
De Witt Nelson
By F. A. Whiteley
his Attorney.

DE WITT NELSON.
TRACTION ENGINE.
APPLICATION FILED JULY 9, 1915. RENEWED JUNE 21, 1918.

1,299,855.

Patented Apr. 8, 1919.
5 SHEETS—SHEET 2.

Witnesses
Theo. Lagaard.
H. A. Bowman

Inventor:
De Witt Nelson.
By A. Whiteley
his Attorney

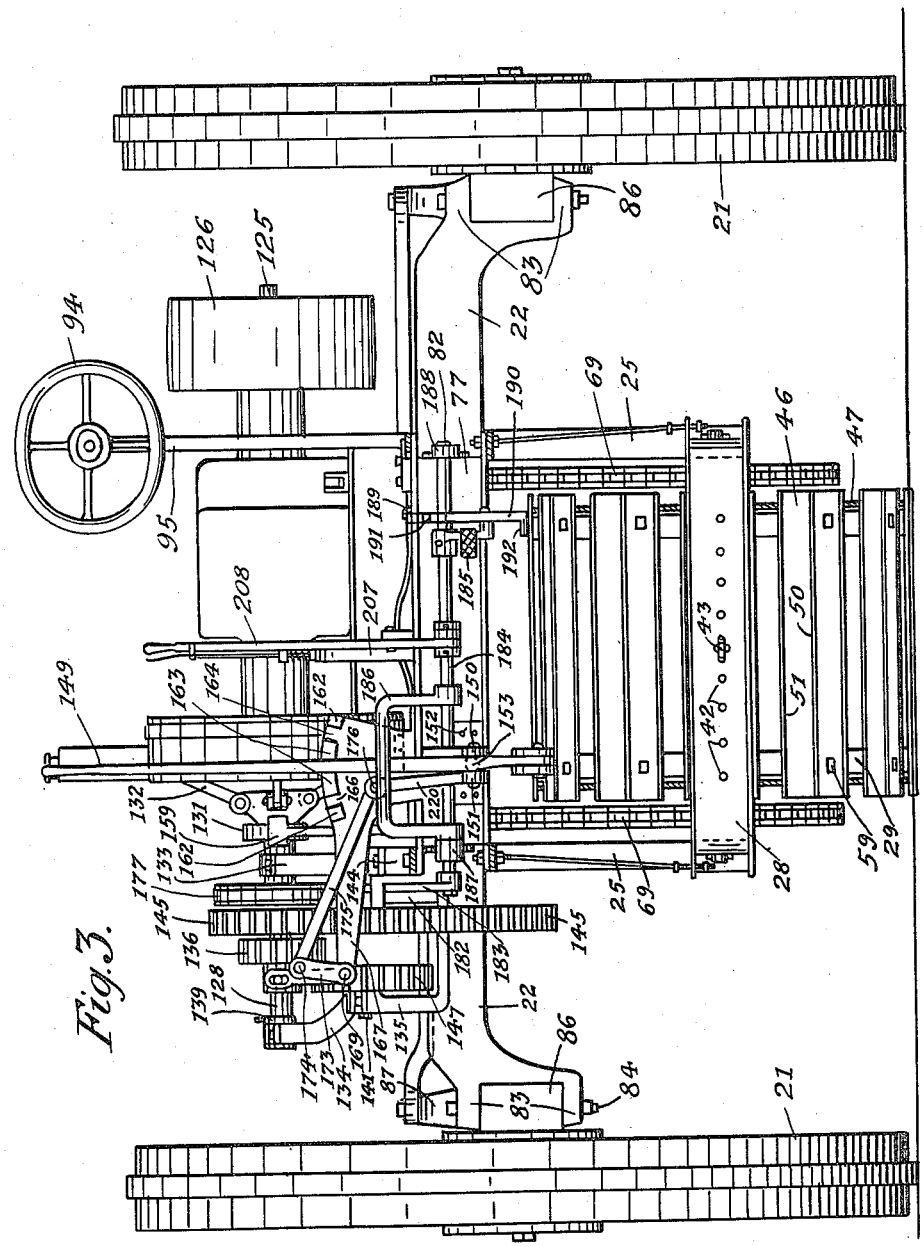

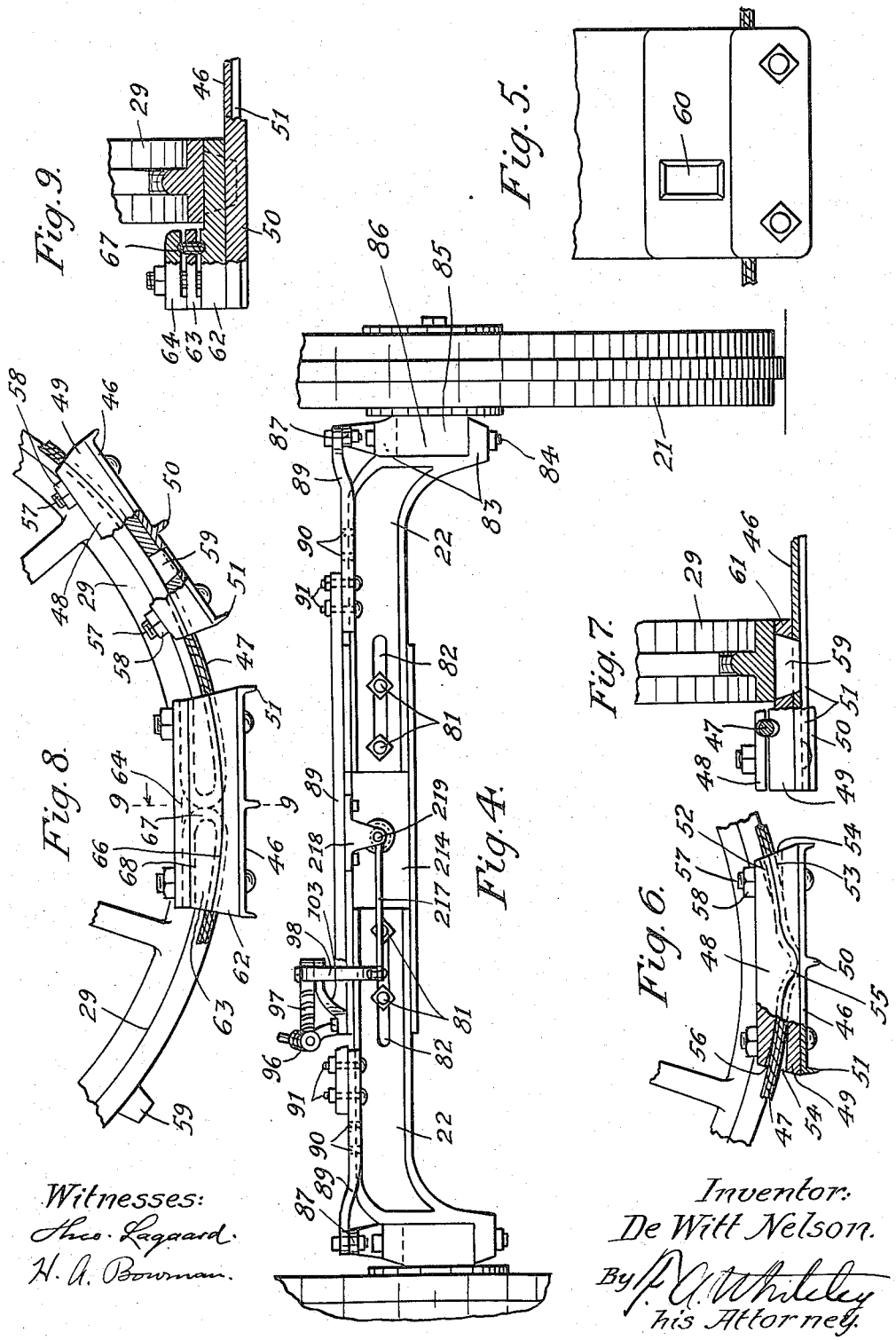

DE WITT NELSON.
TRACTION ENGINE.
APPLICATION FILED JULY 9, 1915. RENEWED JUNE 21, 1918.
1,299,855.
Patented Apr. 8, 1919.
5 SHEETS—SHEET 5.
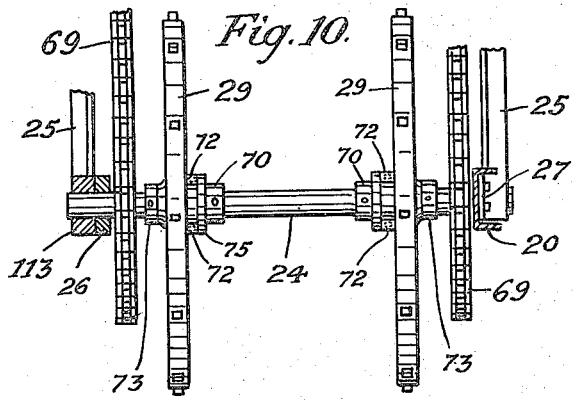
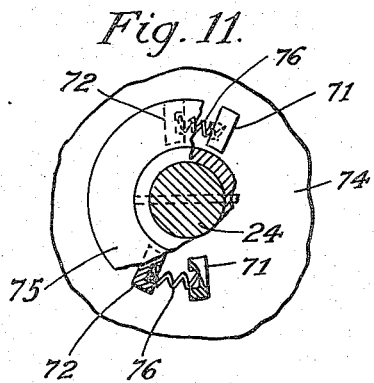
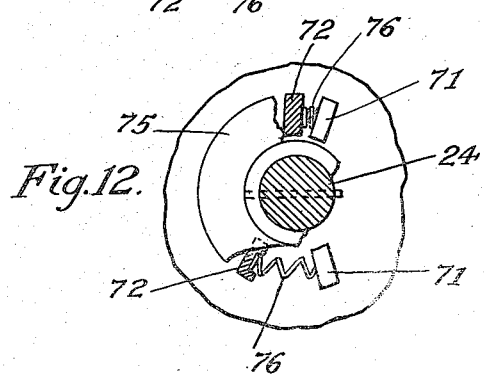
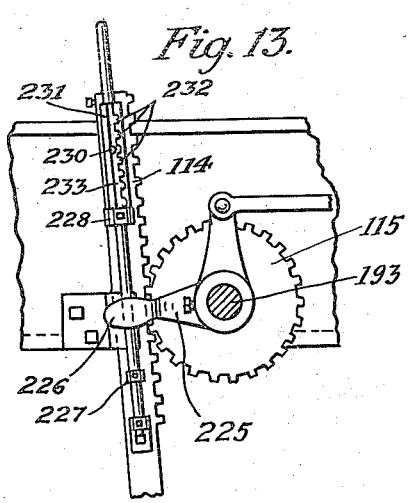
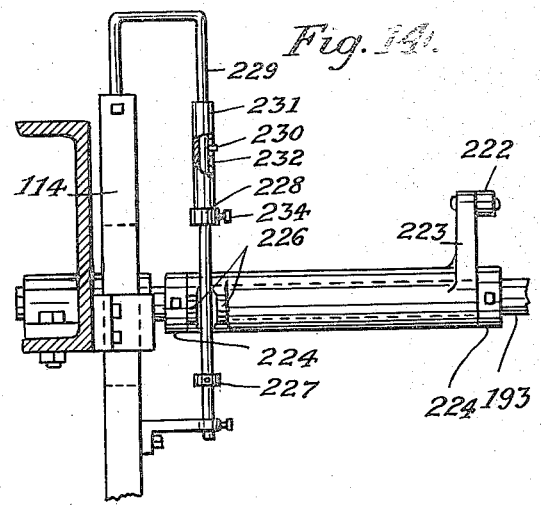
Witnesses:
Inventor:
De Witt Nelson.
By
his Attorney.

UNITED STATES PATENT OFFICE.

DE WITT NELSON, OF MINNEAPOLIS, MINNESOTA, ASSIGNOR TO TOM THUMB TRACTOR COMPANY, OF MINNEAPOLIS, MINNESOTA, A CORPORATION.

TRACTION-ENGINE.

1,299,855.                    Specification of Letters Patent.       Patented Apr. 8, 1919.

Application filed July 9, 1915, Serial No. 38,880. Renewed June 21, 1918. Serial No. 241,295.

*To all whom it may concern:*

Be it known that I, DE WITT NELSON, a citizen of the United States, residing at Minneapolis, in the county of Hennepin and State of Minnesota, have invented certain new and useful Improvements in Traction-Engines, of which the following is a specification.

My invention relates to traction engines and has for its object to provide a tractor of the caterpillar type having a pair of steering wheels and a single traction caterpillar, the frame and engine parts being principally supported upon the caterpillar, together with means for raising and lowering the front end of the caterpillar traction member so as to position the same for effective steering operation.

My invention further embodies novel drawbar mechanism and an efficient and novel organization of driving and transmission elements in relation to the front of the machine together with an extensible front axle and novel means of attaching the members of the drive belt to the cables for operating the same, as well as shock-absorbing devices located upon the caterpillar drive axle and in the caterpillar lifting mechanism.

I additionally provide means for throwing the clutch, changing gears, operating brakes, etc., and automatic stops for stopping the lifting and lowering device applied to the caterpillar such as to render the device practical and capable of operation even by comparatively inexperienced operators.

The full objects and advantages of my invention will appear in connection with the detailed description thereof and are particularly pointed out in the claims.

In the drawings, illustrating the application of my invention in one form,—

Figure 2:
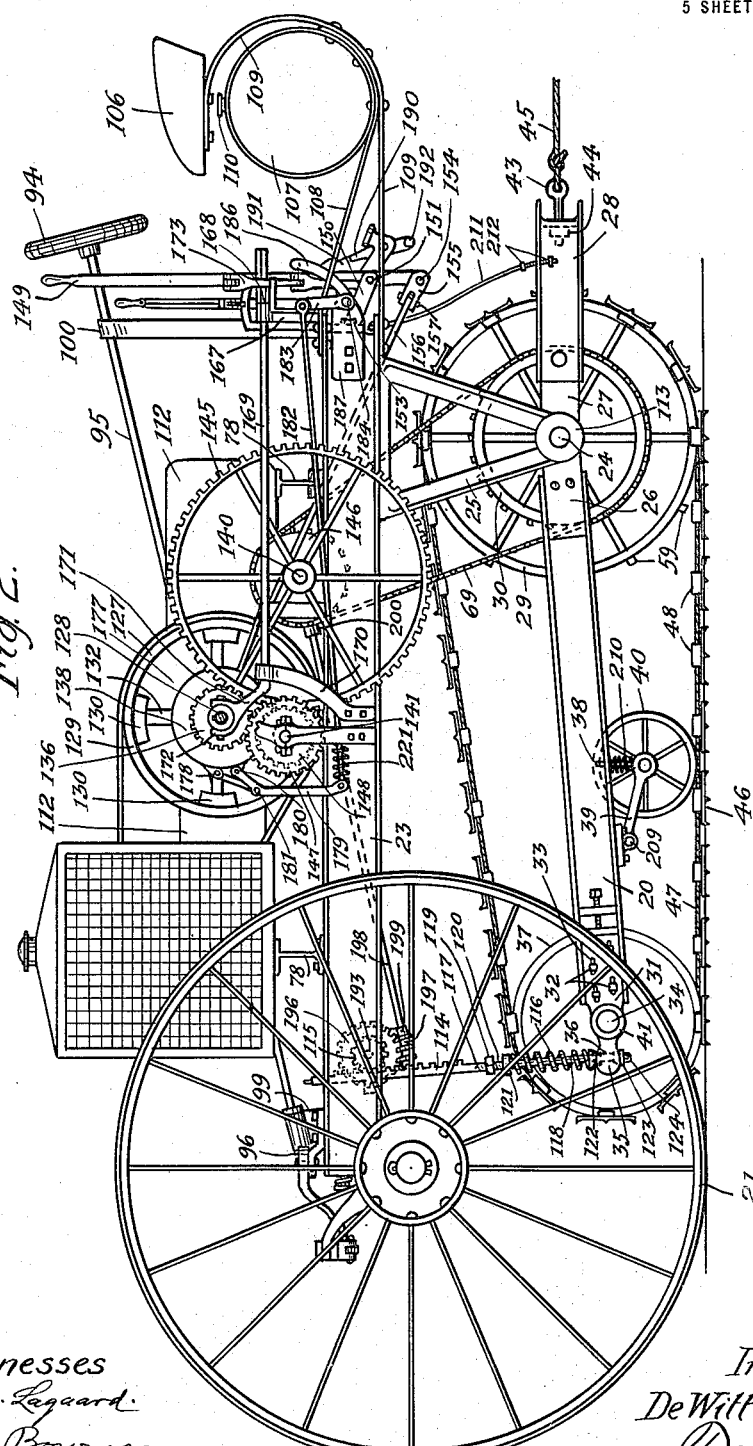

Figure 1 is a plan view of my tractor with the gear casings and other covering removed to show the working parts within. Fig. 2 is a left side elevational view of the machine shown in Fig. 1 with similar parts removed, displaying the transmission, controlling and lifting devices to the best advantage. Fig. 3 is a rear end elevational view drawn to a larger scale of the machine shown in Figs. 1 and 2 with the same parts removed as well as the seat and oil tank. Fig. 4 is a front elevational view of a portion of the front axle and left-hand wheel showing the means by which the axle can be extended. Fig. 5 is a plan view of a portion of the caterpillar belt showing some of the members of the same. Fig. 6 is a side elevational view of the parts shown in Fig. 5 indicating the location of the cable by dotted lines and including a portion of the supporting wheel and Fig. 7 is a rear end sectional fragmental view of the parts shown in Figs. 5 and 6. Fig. 8 is a side elevation of a portion of the caterpillar supporting wheel and belt showing the parts illustrated in Figs. 5, 6 and 7, as well as the method of joining the ends of the cable, and Fig. 9 is a rear end elevational sectional fragmental view of the connecting link and parts shown in Fig. 8, a portion of the same being cut away to make the section come on line 9—9 of Fig. 8. Fig. 10 is a plan view of the drive axle of the caterpillar showing the sprocket wheels, supporting wheels and the caterpillar frame, as well as the shock-absorbing device. Fig. 11 is a fragmental section of the caterpillar axle and supporting wheel showing the construction of the shock-absorbing device and Fig. 12 is a similar view to Fig. 11 showing the same parts under operation. Fig. 13 is a fragmental side elevational view of the caterpillar lifting device and the automatic stop applied thereto, and Fig. 14 is a rear elevational view of the parts shown in Fig. 13.

My tractor comprises the following parts which will be described in detail in the ensuing specification: A caterpillar supported on a frame 20, a pair of steering wheels 21 mounted to rotate upon an extensible axle 22, a main frame 23 attached at one end to the front axle 22 and at the other end to a drive axle 24 of the caterpillar by brackets 25, a power plant and transmission system located on the main frame, a seat and means within reach of the operator for controlling the tractor.

The caterpillar frame comprises two pieces of channel iron 20. Two castings terminating in lugs 26 and 27 form the bearings for shaft 24. Lugs 26 are riveted to channels 20 and lugs 27 serve as pivots for a U-shaped channel 28. Shaft 24 serves as an axle and carries two supporting wheels 29 and two drive sprocket wheels 30. Frame members 20 are fastened at their other ends to castings 31 which are bolted thereto by bolts 32 passing through the elongated slots 33. Casting 31 provides a bearing for an axial shaft 34 and terminates in an extension 35. Extension 35 is of a spherical nature and has a vertical circular hole 36 the sides of which flare, making the diameter at the central portion much less than at the top and bottom of said hole. Shaft 34 carries a pair of supporting wheels 37 which are rigidly keyed to said shaft. Wheels 37 and 29 carry the caterpillar belt, which will be presently described. At the central portion of frame 20 is situated an axial shaft 38 journaled in arms 39 pivoted to oscillate at 209. This shaft carries two idler wheels 40 which are keyed thereto and which serve to keep the belt well in contact with the earth by means of the compression springs 210. Frame 20 is kept from spreading laterally by means of the U-shaped channel member 28 which passes around the caterpillar, and collars 41 fastened to the extreme ends of shaft 34 by set screws. The U-shaped member 28 has a series of holes 42 through which an eye-bolt 43 can be inserted and fastened by a nut 44, said eye-bolt and nut serving as the drawbar to which a rope 45 or other tractive device may be attached. The oscillatory motion of the same is limited by rods 211 and bolts 212.

The caterpillar belt is of a novel design. It passes over supporting wheels 29 and 30 and may be tightened by means of the adjustment 213 acting against casting 31. This belt consists of a number of transverse members 46 fastened to a pair of wire cables 47 by sets of clamps 48 and 49, as best shown in Figs. 5, 6, 7, 8 and 9. The transverse members 46 are made from a rolled section and have fins 50 at their center and shorter fins 51 at their edges, as best shown in Fig. 6. The clamps 48 and 49 are provided with semicircular grooves 52 and 53 through which the cables 47 are passed and clenched. The grooves 52 in clamp 48 lie along the circumference of a circle whose radius is equal to that of the smaller supporting wheels 37. The grooves 53 in clamps 49 lie along a straight line and both grooves are jogged in the center of the clamps at 55 to put a kink in the cable and so hold it securely, allowing the remaining part of the cable to move in the recesses formed at 54 and 56, as the belt passes from wheel 37 to the ground and to wheel 29. Clamps 48 and 49 clamp cable 47 and are fastened to the transverse member 46 by means of bolts 57, which pass completely through clamps 48 and 49 and members 46 and are secured thereto by nuts 58. There are two such bolts and nuts for each set of clamps and the bolts 58, clamps 48 and cables 47 all come on the outside of supporting wheels 37 and 29.

Supporting wheels 29 act as drivers and are supplied with teeth 59 which engage in holes 60 in the portions 61 of clamps 49 which extend under the wheels 29 for this purpose. Holes 60 are continued through the transveres members 46 for the purpose of securing a greater depth to teeth 59 and for the purpose of allowing the mud and sand which may fill holes 60 to pass through as the teeth 59 engage with these holes. Holes 60 are not placed in the center of clamp 49, as can be seen in Fig. 5, in order to preserve fin 50 throughout its whole length. Wheels 37 and 40 are smooth and the belt is kept from sliding off them by means of the clamps 48 which project beyond the rims of these wheels and cause them to roll on portions 61 of said clamps 49. A special set of clamps is used to fasten the ends of the cable, as shown in Figs. 8 and 9. The set in this case comprises three members 62, 63 and 64, of which members 62 and 64 greatly resemble the previously described clamps 48 and 49. Member 62 in this case has the jog in a groove 65 upward instead of downward as in groove 53. Member 63 also has the jog in a groove 66 upward, and furthermore has a hole clear through it as well as a groove 68 on its upper side, making a continuous groove for the looped end of cable 47 to lie in. Member 64 is quite similar to clamp 48 and serves the same purpose. All three members are bolted to one of the transverse members 46 identically with clamps 48 and 49, and member 62 has the holes 60 which engage with teeth 59. From the above description it can be seen that the cables 47 although they never touch wheels 29 or 37 follow them as a perfect belt, having all the flexibility of a leather or fabric belt and much more strength and rigidity, as well as being positively driven by supporting wheels 29. As stated before, this belt is tightened by means of the bolts 32, the slotted holes 33 and the adjustment 213, which provide the proper tension in the same.

The shock-absorbing device located on the caterpillar drive axle 24 is shown in Figs. 10 and 11. The sprocket wheels 30, which carry the chains 69, are pinned to shaft 24. A pair of flanged castings 70 having projecting lugs 71 are pinned to shaft 24, and supporting wheels 29 also supplied with corresponding lugs 72 are loosely mounted on shaft 24. Supporting wheels 29 are kept from lateral sliding by means of the flanged castings 70 and collars 73, also pinned to shaft 24. As is clearly seen in Figs. 10 and 11, lugs 71 and 72 occupy portions of the same cylindrical space, much in the order of the jaws of a square jawed clutch. When symmetrically placed in respect to a plane passing through the center of shaft 24 these lugs face each other and are so disposed on flanges 74 of wheel 29 and flanges 75 of castings 70 as to come some distance apart and allow a rotational movement of wheels 29 on shaft 24 in the vicinity of one tenth of a revolution. Lugs 71 and 72 are provided with cylindrical pocketed cavities which act as a seat for compression springs 76 and keep them in place.

When a shock is given to one side of the caterpillar belt by uneven ground to cause a greater torque on one of the wheels 29 than on the other, the excess energy is momentarily taken up by the springs 76, thus alleviating the stresses in the form of non-uniform torques which are imparted to the tractor.

The main frame of my tractor is also made of channel iron and consists of the longitudinal members 23 jogged at 88 and transverse members 77 and 79 all bent out of one piece of material and spliced in the front by a plate 80. Two I-beams 78 pass transversely across the top of the frame and are bolted thereto. These I-beams form the support for the engine, radiator and other accessories.

The front axle and wheels 21 are best shown in Figs. 1, 3 and 4. The front axle made of two pieces 22 is bolted to an auxiliary transverse member 214 by bolts 81, said bolts passing through slotted holes 82 in the axle members 22 and through circular holes in the member 214, thus permitting the axle to be shortened or elongated at will. Member 214 is pivoted to the transverse frame member 79 at 215 and has its oscillations retarded by the friction caused by spring 216 and bolt 217 pressing members 214 and 79 together. This oscillation of the front axle in a vertical plane overcomes the difficulty of uneven road when the steering wheels 21 engage with the ground, as well as when they are elevated above the ground. The castings 22 are bent downward at their extremities and terminate in ears 83 supplied with vertical holes for the reception of a bolt 84. Castings 85 are supplied with short axial shafts on which wheels 21 revolve and also have ears 86 supplied with vertical holes to take the bolts 84, the assemblage of ears 86, 83 and bolts 84 forming a hinge on which the wheels 21 and their short axes can oscillate in order to steer the tractor. Castings 85 are further provided with projecting arms 87 which issue upward and forward from the centers of ears 85 and become horizontal at their extremities on a level with the top of frame member, as can best be seen in Figs. 1 and 2. Arms 87 are pivotally connected at 92 and 93 by an extensible link 89, the parts of which are supplied with holes 90 and can be bolted together with bolts 91 and can also be shortened or extended.

The steering mechanism, which includes the arms 87 and the link 89, is operated by a hand wheel 94, a steering rod 95, a worm gear 96 and a worm wheel segment 97 meshing with worm gear 96 and having an arm 98 pivotally attached to an auxiliary link 217 moving link 89. Hand wheel 94, which is within easy reach of the operator, is rigidly keyed to steering rod 95. Steering rod 95 is mounted to rotate in bracket bearings 99 and 100 bolted to the top of the right-hand main frame member 23, as best shown in Fig. 1, and is prevented from having longitudinal motion by means of collars 101 rigidly fastened to it by set screws and running close up to the ends of bearing 99. Worm gear 96 is also rigidly fastened to rod 95 by set screws and meshes with the worm wheel segment 97, as before stated. Worm wheel segment 97 and arm 98 are cast in one piece and a pivot or axis 102 for said worm wheel segment is screwed into a casting 103 bolted to the main frame member 79 and is perpendicular to a horizontal plane, thus making said worm wheel segment 97 and arm 98 lie and oscillate in a horizontal plane. This fact places the axes of rod 95 and pivot 102 at an angle with each other different than ninety degrees, as is quite possible with this and other forms of spiral gearing, and also places the axes of pivot 102 and hinges 84 in one plane. The arm 98 of worm wheel segment 97 is pivoted to link 217 by a bolt 104, and link 217 is pivoted to link 89 by a bolt 219 from casting 218 attached to link 217. By the correct proportioning of the arms and links in this steering device, the mechanism will always have the form of a parallelogram and so operate to keep the wheels parallel at no matter what extension of the axle and oscillation of the axle or worm wheel segment.

The main frame members 23, 77 and 79 of the tractor are supported by and connected to the caterpillar frame members 20 and axles 25 and 34 by means now to be described. At the rear ends and on the undersides of main frame members 23 are bolted the pair of castings 25 in the form of V-shaped shaft hangers, as shown in Fig. 2. These hangers have short bearings 113 which rest on the shaft or axle 24 and come outside of the bearings 26 fastened to the caterpillar frame 20, thus preventing caterpillar frame 20 from having longitudinal motion along the shaft 24 and yet permitting said frame to oscillate about axle 24 and still give said axle free rotational movement in these combined bearings. The front part of the main frame members 23 is connected to the front portion of the caterpillar frame 20 by means of racks 114 pivoted in the castings 31 of the caterpillar frame and operated by pinions 115. Each rack 114 carries a shock-absorbing member at its lower end in the form of a spring 116, the method of attaching and operating the same being as follows. The square portion of rack 114, where the teeth end, is turned and threaded at 117 for a distance of about one-third the length of the rack below the teeth, the remaining two-thirds of that rack at 118 being turned to such a diameter that a nut 120 and lock nut 119, which screw on the threaded portion 117 of rack 114 may easily slip over said portion 118. The portion 118 is further supplied with a flat washer 121, the compression spring 116 and a pair of concave washers 122 and 123, the latter being held in place by a pin 124 passing through the extreme end of portion 118 of said rack. As can be clearly seen in Fig. 2, the portion 118 of rack 114 passes through the hole 36 in casting 31 and the concave washers 122 and 123 cover said hole and move on the cylindrical surfaces of the ends 35 of said casting 31, as previously described. When the front end of the caterpillar is subjected to an undue upward force frame 20 is upwardly oscillated on shaft 24, collar 122 is slid upward on portion 118 of rack 114, bearing on the spherical portion 35 of casting 31 and compressing the spring 116 which is held rigid at its other end to rack 114 by means of washer 121, nut 120 and lock nut 119. In the extreme position taken by these parts in a condition as just described, it will become evident that the portion 118 of rack 114 passes through and projects below the casting 31, leaving the washer 123 loosely resting upon pin 124. Also will it be understood that the rod portion 118 of rack 114 will oscillate about an imaginary center in the hole 36 as the casting 31 and frame 20 are oscillated about shaft 24. This will become much more marked as the front of the caterpillar is raised and lowered by the rack 114 and pinion 115, the spherical surfaces 35, the concave washers 122 and 123, and the flared holes 36 permitting this motion. As the frame 20 is rather rigid, any compression transmitted to one of springs 116 will also be transmitted to the other; and likewise any vertical motion of one of racks 114 is also given to the other, as pinions 115 are both on the same shaft. Any desired spring tension can be obtained by adjusting nuts 119 and 120.

The engine 112 of my tractor is preferably of the two-cylinder opposed type and is mounted, as shown in Figs. 1, 2 and 3, on the transverse eye-bars 78. The engine crank shaft 125 carries on one side a pulley 126 and on the other a fly wheel 127, both being rigidly keyed thereon. Crank shaft 125 terminates on the fly wheel side some distance from the edge of the hub of the fly wheel, thus giving a supplementary shaft 128 a short bearing space within the hub of the fly wheel 127. The inner side 129 of the flange of fly wheel 127 serves as a member of a friction clutch with which shoes 130 engage, said shoes being attached by means of the clutch arms 132 to a shifting member 131 splined to the supplementary shaft 128. Shaft 128 is journaled in bearings 133 and 134, bearing 133 forming the cap of a bearing 144 bolted to the main frame member 23, and bearing 134 forms the cap of another bearing 135, similarly fastened. Shaft 128 is further equipped with a gear 136 fitted with a shifting groove and collar 137 and splined to said shaft, a brake drum 138 and a collar 139, both of the latter being rigidly secured thereto by set screws and serving to prevent longitudinal motion of said shaft in its bearings.

The intermediate gears of the transmission system are assembled on a countershaft 140 and a subcountershaft 141. Countershaft 140 is journaled in bearings 142 and 143 bolted to the main frame members 23, and subcountershaft 141 is journaled in bearings 135 and 144, which have been previously mentioned, and are bolted to frame member 23. Countershaft 140 has rigidly secured thereto a gear 145, a pair of sprockets 146, and collars, not visible in the views; also a set of bevel gears and a clutch for raising and lowering racks 114, which will be described later. Subcountershaft 141 has rigidly secured thereto two gears 147 and 148, of which 148 meshes with gear 145 on shaft 140 and is situated the face width of gear 136 from gear 147. Shafts 140 and 141 are so disposed, and gears 147 and 148 are of such relative sizes that gear 136 can slide on supplementary shaft 128 and mesh with either gear 145 or gear 147 without interfering with gear 148, thus giving a slow forward speed and a slow reverse speed. The power transmission through the gears here described is brought down to the sprockets 30 on caterpillar axle 24 from sprockets 146 on countershaft 140 by the chains 69, previously mentioned.

The controlling devices of the transmission system are arranged and located as follows. A hand lever 149 is pivoted in a casting 150 by a bolt 151, said bolt running parallel to the axles and shafts of the tractor. The casting 150 while acting as a support for lever 149 is itself pivoted at 153 on a casting 152 bolted to the rear frame member 77, said pivot 153 of casting 150 consisting of a cap screw the direction of which is parallel to the direction of travel of the tractor, or at right angles to bolt 151. By this casting 150 and said pivots 153 and 151 the hand lever 149 can oscillate backward and forward on bolt 151, and laterally from right to left and vice versa on bolt 153. Hand lever 149 has pivoted at its extreme lower end by a bolt 154 a casting 155, said casting 155 being again pivoted to a connecting link 156 by a bolt 157 at right angles to the previously-named bolt 154. Casting 155 besides transmitting motion imparted to it by hand lever 149 acts as a universal joint of limited movement or oscillation. The connecting link 156 is also pivotally connected to an arm 158 of a bell crank, the other arm 159 of which is fork shaped and operates the shift disk 131 of the friction clutch. This bell crank is pivoted on an ear 160 extending from bearing 142. As the lever 149 is moved forward and backward the clutch is thrown in and out. The motion of hand lever 149 is guided and directed as follows. A casting 161 in the form of a segment is bolted to the top of frame member 77. This segment, as best seen in Fig. 1, has on the outside two long prongs 162 and between these has two shorter prongs 163, all of the prongs being separated by spaces or slots 164, 165 and 166 open at one end. The hand lever 149, as can readily be understood from the previous explanation, is free to move forward and backward in slots 164, 165 and 166 and can move in any direction when past prongs 163 as permitted by prongs 162, the reasons for which will presently be explained. A bracket arm 167, a part of segment casting 161, extends out and provides a bearing 168 for a light shaft 169, the other end of which is supported in a bearing 170 attached to the side of frame member 23. The light shaft 169 forms a bell crank, the forward upturning arm 171 of which terminates in a fork 172 operating the sliding gear 136, and the other arm 173 is a casting and terminates in a pivot 174. A link 175 connects bell crank 169 with an extension 220 of casting 150 through the pivot 174 on arm 173 and another pivot 176 located on said extension. Any side motion of hand lever 149 shifts gear 136 so that it can be made to mesh with either of gears 145 or 147 at will.

The brake drum 138 is supplied with a brake band or shoe 177 rigidly fastened at one end to the bearing 133 by a bolt 178 and at the other end to a lever 179 by a bolt 180, said lever 179 being pivoted to bearing 133 by a cap screw 181. This lever 179 is operated by a link 182, crank arm 183, shaft 184, U-arm 186 and a foot lever 185, the relative assemblage of which is as follows. The light shaft or rod 184 runs along the rear member 77 of the main frame and is journaled in bearings 187, 188 and 189 fastened to the sides of members 23 and 77 of said frame. This shaft 184 comes above the casting 150, and behind extension 220, and has the crank arm 183, the U-shaped arm 186 and the foot lever 185 rigidly attached thereto, in the position best shown in Fig. 3. When crank 183 is moved backward the brake band 177 is tightened and the brake is set. The U-arm 186 is so situated as to come in contact with the back of hand lever 149 so that any backward motion of lever 149 beyond the lugs 163 engages lever 149 with U-lever 186, causing the brake to be set. The foot lever 185 is so situated that any downward motion of the same causes the brake to be set. Foot lever 185 carries a pawl 190 which engages with a stationary ratchet 191, a part of the bearing casting 185. This ratchet and pawl serve to keep the brake set when power is being taken from the tractor for stationary purposes. The pawl 190 may be disengaged by means of the protrusion 192 at its lower end, which can easily be reached by the foot. Accidental setting of the brake is prevented by compression spring 221.

The controlling device as thus described is very simple and effective. When the hand lever 149 is forward in slots 166 or 164 the gear 136 is in mesh with gear 147 or gear 145, respectively, and the tractor is running forward or backward depending upon the direction of rotation of the crank shaft. When said lever is in slot 165 the gear 136 is not in mesh with either of gears 147 or 145 and the power is not transmitted to the caterpillar. As long as said lever is shifted laterally in a plane adjacent to the extremity of lugs 163, the brake is not set. Any backward motion whatsoever of said lever throws the clutch out of operation, and any backward motion beyond the extremities of lugs 163 sets the brake. By this system the brake can be set directly by the same motion whether the tractor be traveling forward or backward and all the operations are confined to one lever.

The raising or lowering of the front end of the caterpillar, as previously described, by means of the racks 114 and pinions 115 is performed by power as follows: A shaft 193, journaled in bearings 194 and 195, fastened to the top of frame members 23 has rigidly attached thereto the pinions 115 previously described and a worm wheel 196. The bearings 194 and 195 also carry guides for the rack 114 to travel in and keep the same in mesh with pinions 115. The shaft 193 is driven through the worm wheel 196 by a worm gear 197 rigidly fastened to a longitudinally situated shaft 198, said shaft being journaled in bearings 199 and 200 hung on the shafts 193 and 140, respectively. Shaft 198 receives its power through bevel gears 201, 202 and 203, of which 201 and 203 are loosely mounted on shaft 140 within the inclosing bearing 200 and are provided with jaw teeth, and 202 is rigidly mounted on the end of shaft 198. A double-headed jaw clutch 204 is splined to shaft 140 to engage with the jaw teeth of either of bevel gears 201 or 203 and is shifted by a bell crank 205 pivoted on inclosing bearing casting 200. An engaging catch 207 is attached to a hand lever 208 and loosely mounted on shaft 184. A connecting link 206 pivotally connects lever 208 and bell crank 205, thus permitting raising and lowering of the caterpillar front by lever 208. To avoid a disaster from raising and lowering the device too far, an automatic stop is used which is of the following form.

The previously mentioned arm 205 of the said bell crank, as best shown in Figs. 1, 13 and 14, is pivotally connected by means of a link 222 to the arm 223 of another bell crank, loosely supported on shaft 193 between collars 224. The other arm 225 of said bell crank terminates in a pair of fork-shaped lugs 226 which are operated by collars 227 and 228 attached to a rod 229. Collar 228 is an integral part of a tube 231, said tube being supplied with a groove 233 and a plurality of holes 232 in communication with groove 233 to engage with a pin 230 on rod 229 for the purpose of shifting the height of collar 228, and in connection with a set screw 234 of holding said collar in place on rod 229. Rod 229 is rigidly attached to the right-hand rack 114 and operates between the prongs 226 of crank arm 225, the collars 227 and 228 engaging these prongs and throwing out the jaw clutch 204 from engagement with either of the gears 201 or 203, thus terminating the downward or upward motion of said rack and caterpillar front, the extent of the downward motion being adjustable through collar 228.

The operator's seat 106 and a fuel tank 107 are both supported upon a set of spring straps 108 and 109 fastened to the tops and bottoms of the rear ends of main frame members 23, the upper springs 108 being bent downward and partially around the tank 107 and riveted to the flanges thereof, while the lower springs 109 project straight out from the lower side of the frame member 23, meet springs 108 and follow them around the tank 107, being riveted to said springs 108, and finally come free up and above the tank to the underside of the seat, where they terminate and are rigidly riveted. As shown in Fig. 1, the tank projects beyond the seat on the left for the purpose of giving access to an opening 110 provided for filling the tank. This, however, necessitates that spring 109 is slightly bent laterally to come under the seat in a proper position at 111. It can be seen from Fig. 2 that the tank 107 is quite rigidly mounted and that the seat, due to the portion of the spring 109 free from and above the tank, is quite protected from sudden jars and shocks.

I claim:

1. A traction engine comprising a main frame, a supplemental frame pivoted to said main frame, means for raising and lowering the forward end of said supplemental frame, a power transmission device for operating said raising and lowering means, and means for automatically rendering said transmission device inoperative at the extreme positions of said supplemental frame.

2. A traction engine comprising a main frame, a supplemental frame pivoted to said main frame, means for raising and lowering the forward end of said supplemental frame including a rack and pinion, a power transmission device for operating said pinion, and means attached to said rack and associated with said main frame for rendering said transmission device inoperative at the extreme positions of the supplemental frame.

3. A traction engine comprising a main frame, a supplemental frame pivoted thereto, a rack and pinion for raising and lowering the forward end of said supplemental frame, a worm drive for operating said pinion, means for driving said worm and means attached to said rack and associated with said main frame for rendering said driving means inoperative at the extreme positions of the supplemental frame.

4. A traction engine comprising a main frame, a supplemental frame pivoted to said main frame, a rack and pinion for raising and lowering the front end of said supplemental frame, means for driving said pinion including a clutch, a lever for operating said clutch, and a pair of stops secured to said rack for engaging said lever to render the driving means inoperable at the extreme positions of said supplemental frame.

5. A traction engine comprising a main frame, depending standards rigidly secured to said main frame, a wheel having its shaft journaled in said standards, a supplemental frame pivotally connected with said shaft, a caterpillar traction belt carried by said supplemental frame and driven from said wheel, and a drawbar connected with said standards in the plane of said shaft and supplemental frame through said shaft.

6. A traction engine comprising a frame, wheels supporting said frame, one of said wheels being a traction wheel, a caterpillar belt running over and being driven by said traction wheel, a shaft on which said traction wheel is loosely mounted, a lug secured to said shaft, an opposed lug secured to said traction wheel and a spring interposed between said lugs.

In testimony whereof I affix my signature in presence of two witnesses.

DE WITT NELSON.

Witnesses:
F. A. WHITELEY,
A. M. ROYAL.